United States Patent [19]

Nuti

[11] Patent Number: 4,928,555
[45] Date of Patent: May 29, 1990

[54] AUTOMATIC TRANSMISSION FOR VEHICLES IN GENERAL

[75] Inventor: Marco Nuti, Pisa, Italy

[73] Assignee: Piaggio & C. S.p.A., Genoa, Italy

[21] Appl. No.: 263,949

[22] Filed: Oct. 28, 1988

[30] Foreign Application Priority Data

Nov. 27, 1987 [IT] Italy ................. 22792 A/87

[51] Int. Cl.[5] .................... F16H 3/02; F16D 21/00
[52] U.S. Cl. ........................ 74/745; 192/48.1
[58] Field of Search .............. 74/745, 336 R, 336 B, 74/689; 192/48.1, 48.8, 48.6, 103 B, 103 R

[56] References Cited

U.S. PATENT DOCUMENTS

| | | | |
|---|---|---|---|
| 2,572,528 | 11/1947 | Selander | 192/48.1 |
| 2,733,613 | 2/1956 | Kreis | 74/336 R |
| 3,372,601 | 3/1968 | Orcutt et al. | 74/336 R |
| 3,442,346 | 5/1969 | Winter et al. | 74/745 X |
| 4,457,185 | 7/1984 | Yoshida et al. | 74/336 R |
| 4,660,438 | 4/1987 | Tatara et al. | 74/745 X |
| 4,674,359 | 6/1987 | Hattori | 74/745 |
| 4,787,268 | 11/1988 | Falzoni | 74/689 |

FOREIGN PATENT DOCUMENTS

0931299 7/1963 United Kingdom ............... 74/745

Primary Examiner—Leslie A. Braun
Assistant Examiner—Benjamin Levi
Attorney, Agent, or Firm—Diller, Ramik & Wight

[57] ABSTRACT

In order to provide an automatic transmission for vehicles, having a wide range of transmission ratio, a first transmission unit is provided, with a transmission ratio variable with continuity, connected on its inlet side with a driving shaft, and at least a second transmission unit and a third transmission unit are provided, each with a fixed transmsision ratio, which is different from each other, with each of them being connected, on its inlet side, with said first transmission unit, and on its outlet side, with a driven shaft of the vehicle, which they supply with motion, alternatively to each other; the second transmission unit and the third transmission unit are connected with the first transmission unit by means of two respective automatic couplings, which engage at different actuation speeds.

10 Claims, 2 Drawing Sheets

AUTOMATIC TRANSMISSION FOR VEHICLES IN GENERAL

The object of the present invention is an automatic transmission for vehicles in general.

In the vehicles equipped with internal combustion engine, the use is known of speed gears having a transmission ratio which is variable with continuity, in particular of the type equipped with a "V"-belt and expanding pulleys, i.e., pulleys wherein the rolling diameter of the belt is changed by axially shifting one of the two half-pulleys, which compose each of said pulleys.

The control of variation of the transmission ratio of said speed gears is generally interlocked with both of power factors, i.e., the engine speed and the transmitted torque, in order to obtain a law of change of the transmission ratio, which is useful for making it possible the best exploitation of the power of the engine to be achieved in correspondence of the various openings of feeding port of said engine.

The degree of achievement of such a result is however conditioned to the amplitude of the total range between the minimum obtainable transmission ratio and the maximum obtainable transmission ratio.

In fact, one immediately understands that the condition of optimum exploitation of power depends on the possibility of maintaining, as extensively as possible, the engine running at a determined number of revolutions per minute at each given feed port opening; and that can be precisely obtained to an extent, which is the greater, the larger the range of the available transmission ratios.

The speed gears with a variable-with-continuity transmission ratio presently manufactured offer a range of ratios, wherein the highest value thereof is at maximum four times as large as the minimum; such a limitation, of technological nature, does not make it possible the advantages to be adequately achieved, which are potentially obtainable by means of the use of the automatic transmissions.

The purpose of the present invention is to propose an automatic transmission unit with a wide total range of transmission ratio values.

Such a purpose is achieved by means of an automatic transmission for vehicles in general, comprising a first transmission unit with a transmission ratio which is variable with continuity, connected, on its inlet side, with a driving shaft of the vehicle, characterized in that it furthermore comprises at least a second transmission unit, and a third transmission unit, each of them having a fixed transmission ratio, which is different from the other, connected, on their inlet side, with the outlet side of said first transmission unit, and, on their outlet side, with a driven shaft of the vehicle, to which they transmit the motion in alternative to each other, the connection between said first transmission unit, and each of said second transmission unit and third transmission unit being carried out by means of coupling means comprising a driving portion and a driven portion, which are automatically engageable and disengageable as a function of the speed of actuation of said driving portion, with the two respective values of speed, at which the coupling means relating to the second transmission unit and to the third transmission unit are engaged, being different from each other.

In the following, a non-limitative example of practical embodiment of the present invention is disclosed, which is shown on the hereto attached drawing tables, wherein.

Figure 1:
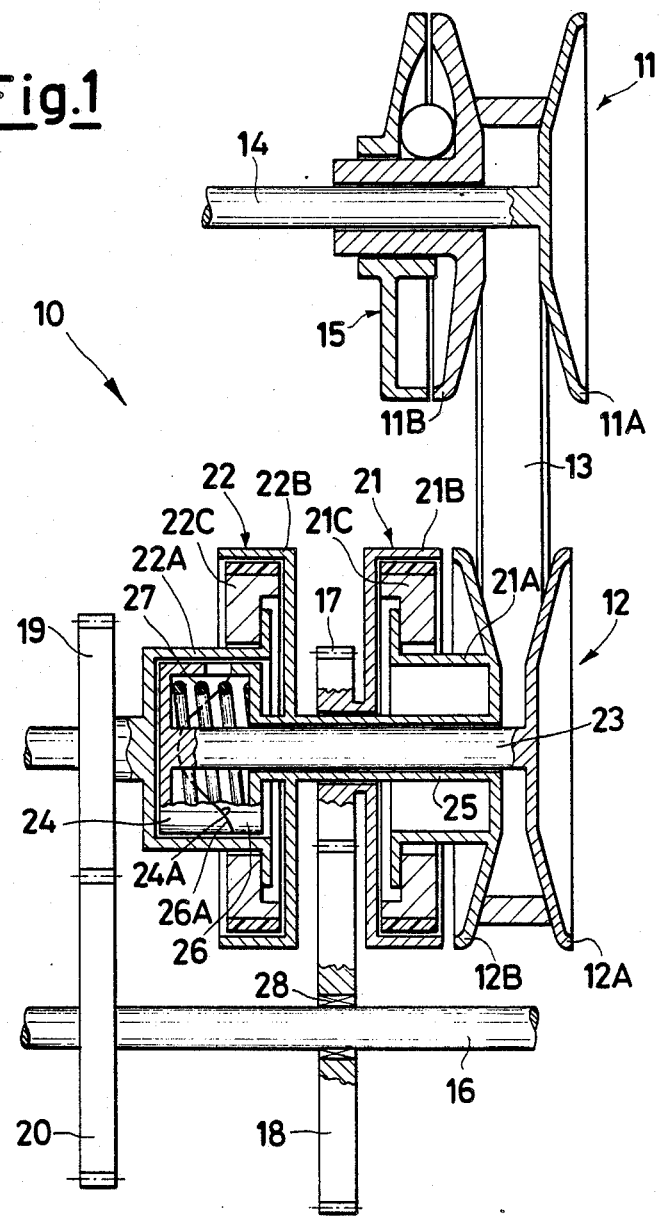
FIG. 1 shows a sectional view of an automatic transmission according to the invention.

The automatic transmission for vehicles shown in FIG. 1, generally indicated by the reference numeral 10, comprises a couple of pulleys 11 and 12, kinematically connected with each other by a transmission belt 13.

In particular, the pulley 11, denominated the "driving pulley", is connected with the engine, not shown, of the vehicle, through a driving shaft 14. The pulley 11 is constituted by two half-pulleys, i.e., an axially fixed half-pulley 11A, and a half-pulley 11B which is axially movable relatively to the half-pulley 11A. The mutual distance between the two half-pulleys 11A and 11B is governed by means of a centrifugal-mass governor 15, which acts on the half-pulley 11B such to change its axial distance relatively to the half-pulley 11A, in order to change the transmission ratio between the pulleys 11 and 12.

The pulley 12, denominated the "driven pulley", is connected with a driven shaft 16 by means of a first couple of gear wheels 17, 18, and a second couple of gear wheels 19 and 20, with the interposition of two clutch couplings, with automatic control means of centrifugal type, 21 and 22. The driven shaft 16 is connected in its turn with the propulsive element (wheel) or propulsive elements (wheels) of the vehicle.

Each clutch coupling is per se known, and comprises, among others, a hub, constituting a driving portion of the coupling, indicated by the reference numeral 21A for the clutch coupling 21, and by the reference numeral 22A for the clutch coupling 22, and a casing, constituting a driven portion of the clutch coupling, indicated by the reference numeral 21B for the clutch coupling 21, and by the reference numeral 22B for the clutch coupling 22. As known, such a clutch coupling comprises centrifugal masses, respectively 21C for the friction coupling 21, and 22C for the friction coupling 22, which, at a suitable angular speed of the hub, render the same hub substantially integral with the casing.

Going back to examine pulley 12, it is composed by two half-pulleys 12A and 12B. The half-pulley 12A is axially movable, and is rigidly connected, through a stem 23, with a half-shell 24. The half-pulley 12B is axially fixed, and is rigidly connected, through a hollow shaft 25, which contains the stem 23 in a free way, with a half-shell 26. The two half-shells 24 and 26 are coupled with each other, as it will be seen in the following, with the interposition of a spring 27 housed inside them, and are housed inside the hub 22A of the clutch coupling 22. The half-pulley 12B is also rigidly connected with the hub 21A of the clutch coupling 21 and, through the hollow shaft 25, is also rigidly connected with the casing 22B of the clutch coupling 22.

The gear wheel 17 is rigidly connected with the casing 21B of the clutch coupling 21. The gear wheel 18 meshes with the gear wheel 17 and is coupled with the driven shaft 16 through a free-wheel 28, which is not described in detail, because it is of known type.

The gear wheel 19 is rigidly connected with the hub 22A of the clutch coupling 22, and inmeshes with the wheel 20, which is integral with the driven shaft 16.

The two half-shells 24 and 26 have two complementary curvilinear profiles, respectively 24A and 26A, which match with each other. In case of a relative rotary movement between the two half-shells 24 and 26, the shape of the two profiles 24A and 26A causes a half-shell to move away from the other half-shell (and therefore the two half-pulleys 12A and 12B to approach to each other), adding their action to the action of the spring 27.

Summing-up, the transmission 10 is constituted by a transmission unit with a transmission ratio variable with continuity, comprising the two expanding pulleys 11 and 12 and the belt 13 connecting said pulleys with each other, and two transmission units with fixed transmission ratio, respectively comprising the couple of gear wheels 17, 18 and the couple of gear wheels 19, 20. The above-said couples of gear wheels constitute reducing wheelworks.

The approaching force supplied by the spring 27 tends to give the transmission the highest-ratio configuration, corresponding to the position of pulley 12 "closed", and of pulley 11 "open"; said force is counteracted by the action of the centrifugal-mass governor 15, which acts on the movable half-pulley 11B of the driving pulley 11 with a force, which is increasingly higher with increasing angular speed of the driving shaft 14, and hence of the engine, in order to cause the two half-pulleys 11A and 11B to approach to each other, and thus obtain a progressive reduction in the transmission ratio with increasing vehicle speed.

The position of equilibrium of the two pulleys 11 and 12 depends, besides on the angular speed of the engine, according to as seen above, also on the value of the torque transmitted, on the outlet side, by the driven pulley 12; in fact, the force applied by the spring 27 is varied by means of the above-seen cam-profile coupling of the two half-shells 24 and 26; the relative sliding of said half-shells varies as a function of the transmitted torque, causing the spring 27 to apply a different force, and hence the transmission to arrange itself in a different equilibrium position, with the angular speed of the driving shaft 14 being the same.

The clutch coupling 21 connects the pulley 12 with the gear wheel 17 at a determined angular speed of the same pulley. The clutch coupling 22 connects the gear wheel 19 with the pulley 12 at a determined angular speed of the same wheel which is higher that the above-said angular speed of engagement of the clutch coupling 21.

The gear wheel 17 transmits the rotary motion to the gear wheel 18, which in its turn transmits it to the driven shaft 16. The gear wheel 19 transmits the rotary motion to the gear wheel 20, which too, in its turn, transmits said rotary motion to the driven shaft 16.

The free-wheel 28 performs the function of transmitting the motion from the gear wheel 18 to the driven shaft 16, and not allowing the contrary to occur, i.e., it does not allow the motion to be transmitted from the driven shaft 16 to the gear wheel 18.

By means of the hereinabove disclosed and illustrated solution, the total range of values of the transmission ratio is equal to the product:

$$\tau_{Cmax}/\tau_{Cmin} \cdot \tau_{Fmax}/\tau_{Fmin}$$

wherein $\tau_{Cmax}$ and $\tau_{Cmin}$ respectively represent the largest transmission ratio, and the least transmission ratio, of the transmission ratios which can be obtained with the variable-transmission-ratio transmission unit, and $\tau_{Fmax}$ and $\tau_{Fmin}$ respectively represent the largest transmission ratio and the least transmission ratio, of the transmission ratios which can be obtained with the two fixed-transmission-ratio transmission units. In the illustrated example, $\tau_{Fmax}$ corresponds to the couple of gear wheels 17, 18; and $\tau_{Fmin}$ corresponds to the couple of gear wheels 19, 20.

Thus, a range is obtained of the transmission ratio, which is by far wider than the range which can be obtained by means of the solutions known from the prior art, as mentioned in the introduction, wherein the total range of the transmission ratio is only given by the first factor of the above-said product.

It should be observed that by means of such a transmission system, all the intermediate transmission ratios within the range comprised between the least and the largest of said transmission ratios are available, in practice said transmission system behaving like a continuous-ratio transmission, having the largest transmission ratio equal to $\tau_{Cmax} \cdot \tau_{Fmax}$, and the least transmission ratio equal to $\tau_{Cmin} \cdot \tau_{Fmin}$.

Figure 2:
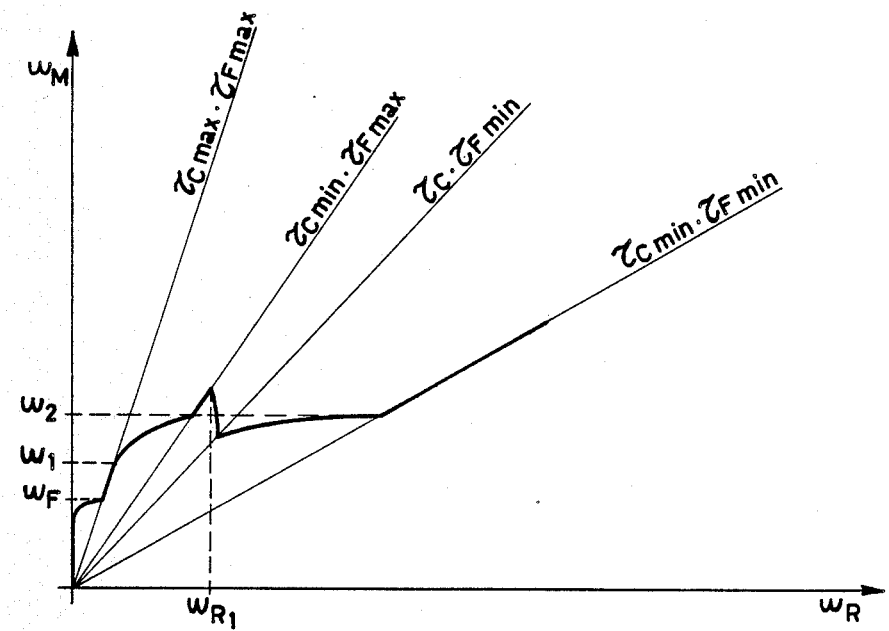
FIG. 2 is a chart relating to the operation of the automatic transmission of FIG. 1.

The operation of the above disclosed system is illustrated hereunder, from an at all general viewpoint, by referring to the chart of FIG. 2.

Such a type of chart has on the ordinate the angular speed of the engine, indicated by $\omega_M$, corresponding to the angular speed of the driving shaft 14, and on the abscissa the angular speed of the driving wheel(s), indicated by $\omega_R$, corresponding to the angular speed of the driven shaft 16.

This chart results to be particularly suitable for describing the behavior of the transmission 10, in that the slope of each half-line from the origin gives the exact value of the total transmission ratio $\tau = \omega_M/\omega_R$ of the whole transmission system comprised between the driving shaft 14 and the driven shaft 16.

In the presently examined case, the tangents of the angles respectively comprised between each one of the four half-lines shown in the figure, and the axis of the abscissae are equal to:

$\tau_{Cmax} \cdot \tau_{Fmax}$ for the most inclined half-line; it corresponds to the configuration of highest transmission ratio for the belt/pulleys transmission unit, practically as shown in FIG. 1, and on condition that the motion is transferred from the pulley 12, through the clutch coupling 21, to the couple of gear wheels 17, 18, to the free-wheel 28 and to the driven shaft 16. Said condition is actually the condition occurring at vehicle start-up, soon after that the speed of the engine has exceeded the value $\omega_F$ at which the engagement of the centrifugal clutch 21 occurs, and is maintained until the said speed reaches the value $\omega_1$; value, at which the action of the centrifugal-mass governor 15 being to have effect. $\tau_{Cmin} \cdot \tau_{Fmax}$ is the value of the tangent of the angle formed by the second half-line with the axis of the abscissae; is the value which is reached by the total transmission ratio under the effect of the action of the centrifugal-mass governor 15 as the angular speed of the engine increases from the value $\omega_1$ to $\omega_2$; the transmission system remains in this end configuration with increasing values of said angular speed, until the speed is reached, which corresponds to the wheel speed $\omega_{R1}$; at this value, the engagement of the clutch coupling 22 occurs.

$\tau_C \cdot \tau_{Fmin}$ is the value of the slope of the third half-line shown in the chart of FIG. 2, wherein $\tau_{Fmin}$ is given by the couple of gear wheels 19, 20 and $\tau_C$ is an intermediate ratio between $\tau_{Cmax}$ and $\tau_{Cmin}$ in the belt/pulleys transmission unit; this value, which is reached by the belt/pulleys transmission at the end of the transient of engagement of the clutch coupling 22 could in reality coincide with the maximum value $\tau_{Cmax}$; it suffices, to that end, that the condition:

$$\tau_{Cmax}/\tau_{Fmin} < \tau_{Cmin}/\tau_{Fmax}$$

is verified; from such condition, it derives that:

$$\tau_{Cmax}/\tau_{Cmin} < \tau_{Fmax}/\tau_{Fmin};$$

summing up, it suffices that the range between the fixed transmission ratios is wider than the range obtainable from the belt/pulleys transmission unit; the represented case is in truth an absolutely general case.

$\tau_{Cmin} \cdot \tau_{Fmin}$ is, finally, the value of the slope of the last half-line shown in the chart; this value corresponds to the condition of highest speed of the vehicle, with the engine speed being the same; under this condition, the driving pulley 11 is completely closed and the driven pulley 12 is completely open, whilst the motion is transmitted downstream this latter through the stem 23, the two half-shells 24 and 26, the casing 22B of the clutch coupling 22, the hub 22A, to the gear wheel 19, from which the motion passes to the gear wheel 20 and finally to the driven shaft 16. The transition towards this latter configuration occurs still due to the effect of the centrifugal-mass governor 15, which, during the preceding engagement of the clutch coupling 22, had returned back into a partially closed position owing to the decrease in angular engine speed consequent to the sharp increase in load applied to the same engine.

It should be considered that in this latter configuration, the angular speed of the driven shaft 16 is always higher that the speed of the gear wheel 18; the correct operation of the transmission is secured by the presence, as already exposed above, of the free-wheel 28, which does not allow the motion to be transmitted from the driven shaft 16 to the gear wheel 18.

Still in order to clarify the operation of the proposed system, we think it useful to finally underline that the engagement of the clutch coupling 22 takes place by causing the centrifugal masses thereof to revolve by means of the kinematic chain constituted by the fixed half-pulley 12B, the clutch coupling 21, the gear wheels 17, 18, the free-wheel 28, the driven shaft 16, the gear wheels 20, 19, and finally the hub 22A; the angular speed of said centrifugal masses is hence definitely higher than that of the respective casing, until the critical engagement speed is reached; the following sharp decrease in angular speed, also caused by the sharp increase in load applied to engine is anyway not such to cause malfunctionings of instabilities to occur, thanks to the gripping character of the clutch coupling used, however of an already largely known and tested type.

In this regard, it should be stressed that both the clutch couplings and the centrifugal-mass governor, as well as the belt/pulleys transmission unit represent, from an industrial viewpoint, highly reliable elements.

It is possible to provide more than two fixed-transmission-ratio transmission units connected with the driven pulley by means of clutch couplings, such to have an automatically-actuated connection sequence between the variable-transmission-ratio unit and the fixed-transmission-ratio units, in a way similar to as hereinabove seen.

The transmission units, both of variable-transmission-ratio type, and of fixed-transmission-ratio type, can be of a type different from those shown, on condition that the same aims are reached.

Furthermore, other types of couplings can be used, which automatically engage and disengage as a function of the speed of the driving portion of the same coupling.

I claim:

1. An automatic transmission for a vehicle comprising a first transmission unit with a transmission ratio which is variable with continuity, said first transmission unit being adapted to be connected to a driving shaft of vehicle, at least a second transmission unit and a third transmission unit, each of said second and third transmission units having a fixed transmission ratio which differ from each other, a driven side of said second and third transmission units being connected to a drive side of said first transmission unit, a drive side of said second and third transmission units being connected to a driven shaft of a vehicle to which motion is alternatively transmitted, the connection between said first transmission unit and each of said second transmission unit and said third transmission unit being through first and second coupling means each including a driving portion and a driven portion, said driving and driven portions being automatically engageable and disengageable as a function of the speed of actuation of said driving portions, the speed of actuation of said first and second coupling means driving portions differing for the engagement of the second and third transmission units, each of said second transmission unit and third transmission unit includes at least a respective first and second pair of meshed gear wheels, a first gear wheel of said first pair of meshed gears being rigidly connected to the driven portion of said first coupling means, a second gear wheel of said first pair of meshed gear wheels being connected to said driven shaft, a first gear wheel of said second pair of meshed gear wheels being rigidly connected to the driving portion of said second coupling means, and a second gear wheel of said second pair of meshed gear wheels being rigidly connected to the driven shaft.

2. The automatic transmission as defined in claim 1 wherein said first and second coupling means are clutch coupling means.

3. The automatic transmission as define in claim 1 wherein said first and second coupling means are clutch coupling means friction-coupled through centrifugal masses.

4. The automatic transmission as defined in claim 1 wherein said first transmission unit comprises a driving pulley and a driven pulley interconnected by a transmission belt, said driving and driven pulleys each being formed by two pulley halves, and at least one of each pulley half being axially movable relative to the other pulley half.

5. The automatic transmission as defined in claim 4 including a centrifugal-mass governor connected to one of the pulley halves of the driving pulley for effecting an axial change in the distance between the pulley halves as a function of angular speed.

6. The automatic transmission as defined in claim 4 wherein one of said driven pulley halves is rigidly connected with the driving portion of said first coupling means and is rigidly connected with the driven portion of said second coupling means.

7. The automatic transmission as defined in claim 6 wherein the two pulley halves of the driven pulley are rigidly connected with two respective half-shells mutually coupled along two cam profiles, and an elastic element housed between said two cam profiles for keeping said pulley halves in mutually approaching position upon relative rotation therebetween.

8. The automatic transmission as defined in claim 4 wherein the two pulley halves of the driven pulley are rigidly connected with two respective half-shells mutually coupled along two cam profiles, and an elastic element housed between said two cam profiles for keeping said pulley halves in mutually approaching position upon relative rotation therebetween.

9. The automatic transmission as defined in claim 8 including a centrifugal-mass governor connected to one of the pulley halves of the driving pulley for effecting an axial change in the distance between the pulley halves as a function of angular speed.

10. An automatic transmission for a vehicle comprising a first transmission unit with a transmission ratio which is variable with continuity, said first transmission unit being adapted to be connected to a driving shaft of the vehicle, at least a second transmission unit and a third transmission unit, each of said second and third transmission units having a fixed transmission ratio which differ from each other, a driven side of said second and third transmission units being connected to a drive side of said first transmission unit, a drive side of said second and third transmission units being connected to a driven shaft of the vehicle to which motion is alternatively transmitted, the connection between said first transmission unit and each of said second transmission unit and said third transmission unit being through first and second coupling means each including a driving portion and a driven portion, said driving and driven portions being automatically engageable and disengageable as a function of a speed of actuation of said driving portions, the speed of actuation of said first and second coupling means driving portions differing for the engagement of the second and third transmission units, each of said second transmission unit and third transmission unit includes at least a respective first and second pair of meshed gear wheels, a first gear wheel of said first pair of meshed gears being rigidly connected to the driven portion of said first coupling means, a second gear wheel of said first pair of meshed gear wheels being connected to said driven shaft, a first gear wheel of said second pair of meshed gear wheels being rigidly connected to the driving portion of said second coupling means, a second gear wheel of said second pair of meshed gear wheels being rigidly connected to the driven shaft, said first transmission unit comprises a driving pulley and a driven pulley interconnected by a transmission belt, said driving and driven pulleys each being formed by two pulley halves, and at least one of each pulley half being, axially movable relative to the other pulley half, said two pulley halves of the driven pulley being rigidly connected with respective half-shells mutually coupled along two cam profiles, and between which an elastic element is housed, which tends to keep the two half-pulleys in a mutually approached position, with the action of the two cam profiles being such to cause the mutual approaching of the two half-pulleys in case of relative revolution thereof.

* * * * *